Patented Jan. 5, 1954

2,665,293

UNITED STATES PATENT OFFICE 2,665,293

PREPARATION OF THE ETHYL ESTERS OF SULFONIC ACIDS

Carl E. Johnson, Griffith, and Arthur P. Lien, Highland, Ind., assignors to Standard Oil Company, Chicago, Ill., a corporation of Indiana No Drawing. Application May 17, 1951, Serial No. 226,945

7 Claims. (Cl. 260—456)

This invention relates to the preparation of the ethyl esters of sulfonic acids and has reference more particularly to a catalytic process for the preparation of ethyl sulfonate esters.

Esters have been readily prepared from sulfonic acids in reaction with olefins higher than ethylene, the esterification reaction proceeding at mildly super-atmospheric pressures and temperatures slightly above room temperature. Ethylene has resisted attempts to esterify it with sulfonic acids and at best it could be obtained only under severe conditions of temperature and pressure and then only in low yields and after a prolonged reaction time.

A primary object of the present invention is the provision of a process for preparing ethyl esters of sulfonic acids. Another object of the invention is the provision of a process for the preparation of ethyl esters of alkyl, aryl, aralkyl, and alkaryl sulfonic acids from ethylene. The invention has for other objects such other advantages or results as will be found to obtain in the specification and in the claims hereinafter made.

We have found that the foregoing objects can be accomplished by providing a catalytic esterification of the ethylene. Ethylene is reacted with an aryl, alkyl, aralkyl, or alkaryl sulfonic acid having at most about 8 carbon atoms per molecule at temperatures between about —20° and 80° C. and at a pressure between about 1 and 80 atmospheres in the presence of from 0.01 mol to 0.5 mol of boron-trifluoride per mol of sulfonic acid.

In carrying out the reaction, ethylene is flowed into a reaction zone containing the sulfonic acid, which is preferably in relatively pure anhydrous state but can be present in crude form or be dispersed in an organic solvent. Ethylene is absorbed up to the desired pressure of operation of the process, which can be between 1 and 80 atmospheres and is preferably between about 10 and 60 atmospheres. The sulfonic acid and ethylene are mixed in the reaction zone in a molar ratio between about 0.5 to 3.0 mol of ethylene per mol of sulfonic acid and preferably between about 0.9 to 1.2 mol of ethylene per mole of sulfonic acid.

Boron trifluoride is introduced into the reaction zone in an amount ranging from 0.01 mol to 0.5 mol and preferably from about 0.05 to 0.25 mol of total boron trifluoride per mol of sulfonic acid. The boron-trifluoride catalyst is preferably introduced into the said reaction zone with the sulfonic acid but it can be introduced alone or prior to introduction of the reactants or it can be introduced with the inflowing ethylene. The esterification reaction is strongly exothermic and, therefore, the reactants must be cooled during the reaction. The esterification of ethylene is accomplished at temperatures between about —20° and 80° C. Lower temperatures within the range provide a purer product, and it is preferred, of course, not to go below the convenient cooling temperature of 0° C. It is preferred to avoid temperatures higher than the range herein disclosed for the esterification reaction because the use of temperatures above 80° C. will result in polymerization of the olefin. In the absence of boron trifluoride the ester is stable to temperatures of 175° to 200° C.

In a batch reaction the pressure will decrease during the course of the reaction and the absorption of the ethylene. However, the process can be operated at a uniform pressure, as, for example, in a continuous process in which ethylene is continually introduced into a reaction zone at substantially the rate at which it is consumed.

The reaction product and unreacted constituents are removed from the reaction zone and boron trifluoride, being a gas, is readily separated from the product and unreacted acid. The boron trifluoride and any unreacted ethylene liberated therewith are preferably recycled to the reaction zone. However, excess ethylene rarely appears in the effluent gases. The produced ethyl esters and any excess sulfonic acid are then separated and unreacted sulfonic acid is also recycled to the reaction zone.

The ethyl sulfonic ester is separated from unreacted reaction constituents preferably and most simply by a water wash and a subsequent decanting of the ester. A more refined product is obtained by admixing the total product, including the unreacted constituents, with an inert organic solvent, for example, a readily volatile ether. Undissolved sulfonic acids are separated and withdrawn from the solution mixture. The ether solution of product ester is then washed with a mild alkaline aqueous solution and is dried over a dessicant. The dried ether solution of ester is evaporated for removal of ether and an ethyl ester of the employed sulfonic acid is recovered.

In the following specific examples, which are presented to illustrate the present invention, examples are provided in which the ethyl esters of both aryl and alkyl sulfonic acids are prepared under various conditions.

Example I

A reaction bomb with stirring apparatus was employed as the reaction vessel, and to this vessel there were charged 0.37 mols of methanesulfonic acid and 0.028 mol of boron trifluoride. Ethylene was charged into the bomb under 900 pounds per square inch gauge pressure. The reaction temperature was permitted to vary within the range of 25° to 80° C. After the rate of absorption of the ethylene had decreased markedly as indicated by a relatively sudden increase in gauge pressure, the reaction was halted and the product liquid was withdrawn. A yield of 0.234 mol of ethyl methanesulfonate was separated from the reaction mixture. The ethyl methanesulfonic ester boiled at 87° to 89° C. at a pressure of 10.5 mm. of mercury, which corresponds to a reported value of 85 to 86° C. at 10 mm. pressure. The material had a specific gravity of 1.18 and a refractive index of $n_D^{20}$ of 1.4175.

Example II

In this example an aryl sulfonic acid was employed. There was charged to a reaction bomb having stirring equipment 0.325 mol of toluene sulfonic acid. Ethylene was introduced into the bomb until a pressure of 575 pounds per square inch gauge was obtained. Only a very small pressure drop, presumably caused by solution of ethylene in the acid, was observed upon stirring the reactants at room temperature. Thereafter the reaction mixture was vented and purged to remove ethylene, and 0.147 mol of boron trifluoride were added to the toluene sulfonic acid. Ethylene was again introduced until a pressure of 500 pounds per square inch was reached. This pressure dropped in five minutes to 150 pounds per square inch gauge. The reaction temperature was maintained at substantially room temperature and the introduction of ethylene in the described manner was repeated several times. The reactor contents were then poured on to cracked ice and 0.223 mol of ethyl toluenesulfonate were isolated. This yield corresponded to a 68.6 percent conversion of the sulfonic acid to ethyl ester.

Example III

In this example methane sulfonic acid was employed as the esterifying acid and 0.456 mol of this acid were charged to a bomb equipped with stirring apparatus. To show that boron trifluoride is not merely a dehydrating agent and does not act in this manner alone to effect an esterification of the ethylene, 0.031 mol of phosphorus pentoxide were added to the methane sulfonic acid and esterification reaction was attempted in the presence of this dehydrating agent and in the absence of boron trifluoride. Ethylene was charged under pressure into the reactor but no decrease in pressure was observed and no esterification was accomplished.

Thereafter 0.0221 mol of boron trifluoride were introduced. Decrease in reactor pressure and absorption of ethylene began immediately. Ethylene was forced into the reactor until a pressure of 800 pounds per square inch gauge was reached. The reactants were maintained at room temperature. A total of 0.357 mol of ethylene was absorbed, corresponding to a 78 percent conversion of the methane sulfonic acid to ethyl methane sulfonate.

Example IV

Mixed alkane sulfonic acids containing methane-, ethane-, propane-, and possibly some butane-sulfonic acid were esterified with ethylene in this example. To the described bomb there was added .534 mol of the said mixed sulfonic acids containing 0.28 mol water and 0.021 mol $H_2SO_4$. After addition of 0.33 mol of boron trifluoride, ethylene was charged to the reactor under pressure of 850 pounds per square inch. The reaction mixture was maintained at temperatures of about 0° C. by immersing the bomb in ice water. Pressure on the bomb was maintained at 850 pounds per square inch gauge. A yield of mixed ethyl alkane sulfonates of .253 mol, corresponding to 47.5 percent conversion of the acids to esters, was obtained.

The ethyl esters of sulfonic acids are considerably more stable than the sulfonate esters of higher olefins and consequently are potentially more useful for such purposes as dye synthesis, and the like, because they can be more readily transported and stored. For example, ethyl ethane-sulfonate will not decompose until a temperature of between 175° and 200° C. is reached. Isopropyl ethanesulfonate, on the other hand, decomposes on heating to about 60° C. if acid is present and to 126° C. if acid is carefully removed.

Having described our invention, we claim:

1. A process of preparing ethyl esters of sulfonic acids comprising the steps of mixing ethylene and a sulfonic acid selected from the group consisting of aliphatic and aromatic sulfonic acids having at most about 8 carbon atoms per molecule and effecting reaction therebetween at a superatmospheric pressure and at a temperature between about −20° and 80° C. and in the presence of from 0.01 mol to 0.5 mol of boron trifluoride per mol of sulfonic acid, and separating from the reaction mixture the ethyl ester of the selected sulfonic acid.

2. A process of preparing ethyl esters of sulfonic acids comprising the steps of introducing ethylene into a reaction zone containing a sulfonic acid selected from the group consisting of aromatic and aliphatic sulfonic acids having at most about 8 carbon atoms per molecule, and admixing the same in a ratio between about 0.5 and 3.0 mols of ethylene per mol of sulfonic acid under a pressure between about 10 and 60 atmospheres and at a temperature between about −20° and 80° C., effecting reaction therebetween in the presence of from 0.01 mol to 0.5 mol of boron trifluoride per mol of sulfonic acid and recovering the ethyl ester of the said selected sulfonic acid from the reaction mixture.

3. The process of claim 2 in which the selected acid is toluenesulfonic acid.

4. The process of claim 2 in which the selected acid is ethanesulfonic acid.

5. The process of claim 2 in which the selected acid is methanesulfonic acid.

6. A process of preparing ethyl alkyl sulfonates comprising the steps of mixing an alkane sulfonic acid having at most 8 carbon atoms per molecule and from about 0.5 to 3.0 mols of ethylene per mol of the alkane-sulfonic acid, maintaining the temperature of the mixture between −20° and 80° C. and under a pressure between about 10 and 60 atmospheres, effecting reaction between the ethylene and said acid in the presence of from about 0.01 mol to 0.5 mol of boron trifluoride per mol of sulfonic acid and separating ethyl alkanesulfonate from the said admixture.

7. A process of producing the ethyl esters of a sulfonic acid selected from the group consisting of aromatic and aliphatic sulfonic acids having at most 8 carbon atoms per molecule, comprising the steps of mixing the selected acid at a temperature between about 0° and 80° C. and under a super-atmospheric pressure with between 0.9 and 1.2 mols per mol of acid, of ethylene in the presence of from about 0.01 mol to 0.5 mol of boron trifluoride per mol of sulfonic acid, maintaining the ethylene and said acid together and within the said temperature range for sufficient time to effect reaction therebetween, separating unreacted ethylene and boron trifluoride from unreacted acid and ethyl ester of the selected sulfonic acid, recycling the said separated ethylene and boron trifluoride to the contact of a selected sulfonic acid, washing the said ethyl ester and unreacted acid in water and separating the latter as an aqueous solution from product ester.

CARL E. JOHNSON.
ARTHUR P. LIEN.

References Cited in the file of this patent

UNITED STATES PATENTS

| Number | Name | Date |
|---|---|---|
| 2,065,540 | Schneider | Dec. 29, 1936 |
| 2,265,945 | Loder | Dec. 9, 1941 |
| 2,576,535 | Proell | Nov. 27, 1951 |